(12) United States Patent
Feng et al.

(10) Patent No.: US 8,747,587 B2
(45) Date of Patent: Jun. 10, 2014

(54) MULTI-LAYERED MATERIAL AND A METHOD FOR MAKING THE SAME

(75) Inventors: Chung-Chih Feng, Kaohsiung (TW); Yung-Yu Fu, Kaohsiung (TW); Kun-Lin Chiang, Kaohsiung (TW); Jung-Ching Chang, Kaohsiung (TW); Chih-Chenh Lin, Kaohsiung (TW); Chun-Wei Wu, Kaohsiung (TW); Pei-Huo Huang, Kaohsiung (TW); I-Peng Yao, Kaohsiung (TW)

(73) Assignee: San Fang Chemical Industry Co., Ltd., Kaohsiung (TW)

( * ) Notice: Subject to any disclaimer, the term of this patent is extended or adjusted under 35 U.S.C. 154(b) by 296 days.

(21) Appl. No.: 13/080,916

(22) Filed: Apr. 6, 2011

(65) Prior Publication Data

US 2011/0250811 A1    Oct. 13, 2011

(30) Foreign Application Priority Data

Apr. 9, 2010    (TW) ................................ 99111176 A

(51) Int. Cl.
*B32B 5/18* (2006.01)
*B32B 5/24* (2006.01)

(52) U.S. Cl.
USPC .......... 156/78; 156/246; 428/316.6; 442/223; 442/372

(58) Field of Classification Search
USPC .......... 156/78, 246; 428/316.6; 442/223, 372
See application file for complete search history.

(56) References Cited

U.S. PATENT DOCUMENTS

| | | | |
|---|---|---|---|
| 4,017,656 A * | 4/1977 | Lasman et al. | 428/86 |
| 2008/0081153 A1 * | 4/2008 | Yeh | 428/156 |
| 2010/0062235 A1 | 3/2010 | Nadella et al. | |

FOREIGN PATENT DOCUMENTS

| | | | |
|---|---|---|---|
| CN | 101003949 A | * | 7/2007 |
| CN | 101725054 A | * | 6/2010 |
| JP | 2005-125785 A | | 5/2005 |
| TW | 200817066 | | 4/2008 |

OTHER PUBLICATIONS

Notice of Allowance issued Dec. 26, 2012 by TIPO for the counterpart TW Patent Application No. 09111176 cites US 2010/0062235 and JP 2005-125785.
English Abstract of JP 2005-125785.
Office Action of foreign counterpart Application No. CN 201010237126.2 dated Sep. 2, 2013 citing the following: CN 101725054, TW 200817066, CN 101003949.
English Translation Summary of Office Action of counterpart Application No. CN 201010237126.2 & English Translation of Abstracts of CN 101725054, TW 200817066, CN 101003949.

* cited by examiner

*Primary Examiner* — Michael Tolin

(74) *Attorney, Agent, or Firm* — WPAT, P.C.; Anthony King; Kay Yang

(57) ABSTRACT

A multi-layered material and a method for making the same are provided. The multi-layered material includes a first foamed layer, a substrate, a second foamed layer, and a surface layer. The first foamed layer has a plurality of first cells. The substrate is a fabric. The second foamed layer has a plurality of second cells. The foaming method of the second foamed layer is different from that of the first foamed layer. The size of the second cells is different from that of the first cells. The variation in size of the second cells is different from that of the first cells. The surface layer is disposed on the second foamed layer. Thus, when the multi-layered material is used as a surface cover of a ball, it can provide excellent resilience and control, and improve manufacturing efficiency.

11 Claims, 9 Drawing Sheets

MULTI-LAYERED MATERIAL AND A METHOD FOR MAKING THE SAME

BACKGROUND OF THE INVENTION

1. Field of the Invention

The present invention relates to a multi-layered material and a method for making the same, and more particularly to a multi-layered material having two different foamed structures and a method for making the same.

2. Description of the Related Art

In the manufacturing of various types of balls, a simple ball body is formed entirely by means of direct injection molding a rubber material. A machine sewing or hand sewing process is further developed to create a certain appearance, texture, or comply with specifications dictated by a particular sport. In this process, a bladder needs to be disposed inside the ball body for reason of sewing; air is filled into the bladder during inflation, such that the bladder inflates the ball body, and then a surface cover of the ball is sewn onto the bladder by machine or hand. Conventionally, materials for making the surface cover of the ball include thermoplastic urethane (TPU), polyvinyl chloride (PVC), and polyurethane (PU), which are non-foamed or single-layer foamed.

The conventional surface cover structure of the ball has the following disadvantages. Since the conventional surface cover structure of the ball is rather hard, the hands or feet of players are easily injured due to impact during strenuous sports such as football and volleyball, and the conventional surface cover structure has a poor tactile feel and can make the ball difficult to control. Reinforcement and various other improvements need to be implemented during manufacturing of the ball body, which complicates the manufacturing process and increases the manufacturing cost of the ball body.

Therefore, it is necessary to provide an innovative and inventive multi-layered material and a method for making the same.

SUMMARY OF THE INVENTION

The present invention provides a multi-layered material, which comprises a first foamed layer, a substrate, a second foamed layer and a surface layer. The first foamed layer is formed by foaming a first polymer resin, and has an upper surface, a lower surface and a plurality of first cells. The substrate is a fabric disposed on the upper surface or the lower surface of the first foamed layer. The second foamed layer is disposed above or on the substrate. The second foamed layer is formed by foaming a second polymer resin, and has a plurality of second cells. The variation in size of the second cells is different from that of the first cells. The surface layer is disposed on the second foamed layer, and the material of the surface layer is a third polymer resin.

The present invention further provides a method for making a multi-layered material, which comprises the following steps: (a) forming a third polymer mixture on a release paper, the third polymer mixture containing a third polymer resin; (b) drying the third polymer mixture to form a surface layer; (c) foaming a second polymer mixture and then forming the foamed second polymer mixture on the surface layer, the second polymer mixture containing a second polymer resin; (d) drying the second polymer mixture to form a second foamed layer, the second foamed layer having a plurality of second cells; (e) laminating a substrate on the second foamed layer, the substrate being a fabric; (f) foaming a first polymer mixture and then drying the foamed first polymer mixture to form a first foamed layer, the first polymer mixture containing a first polymer resin, the first foamed layer having a plurality of first cells, wherein the foaming method of step (c) is different from that of step (f), and the variation in size of the second cells is different from that of the first cells; and (g) forming the first foamed layer on the substrate to obtain a multi-layered material.

When the multi-layered material is used as a surface cover of a ball, it can absorb substantial impact energy, and the combination of two different foamed structures (the first foamed layer and the second foamed layer) can provide better resilience and control. In addition, the multi-layered material does not require any reinforcement or improvement, thereby improving manufacturing efficiency.

DETAILED DESCRIPTION OF THE INVENTION

Figure 1:
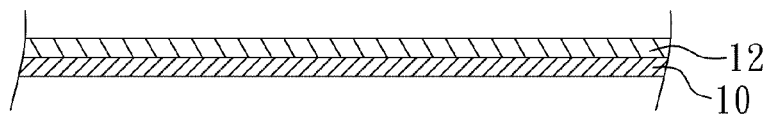
FIGS. 1 to 8 are schematic views illustrating steps of a method for making a multi-layered material according to a first embodiment of the present invention.

FIGS. 1 to 8 are schematic views illustrating steps of a method for making a multi-layered material according to a first embodiment of the present invention. Referring to FIG. 1, a third polymer mixture is formed on a release paper 10 by coating, and then the third polymer mixture is dried at a temperature of 50° C. to 130° C. to form a surface layer 12. The third polymer mixture contains a third polymer resin, the third polymer resin has a solid content lower than 50%, and a material of the third polymer resin is a polyurethane resin.

Figure 2:
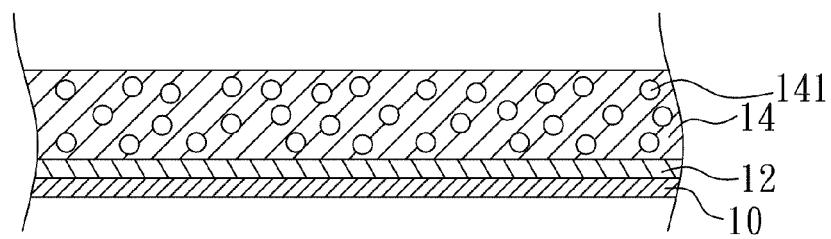

Referring to FIG. 2, a second polymer mixture is foamed and then formed on the surface layer 12 by coating, and then the second polymer mixture is dried at a temperature of 120° C. to 180° C. to form a second foamed layer 14. The second foamed layer 14 has a plurality of second cells 141. The second polymer mixture contains a second polymer resin and other additives. The second polymer resin has a solid content higher than 50%, the material of the second polymer resin is polyurethane resin, polystyrene (PS), polyvinyl chloride (PVC), ethylene-vinyl acetate copolymer (EVA), polyethylene (PE), styrene-butadiene (SB), or styrene-butadiene-styrene (SBS). The second polymer resin is foamed by chemical foaming. The second cells 141 are not in communication with each other and form an enclosed cavity structure.

Figure 3:
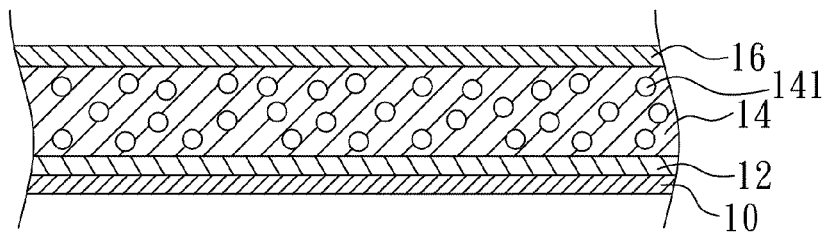
Figure 4:
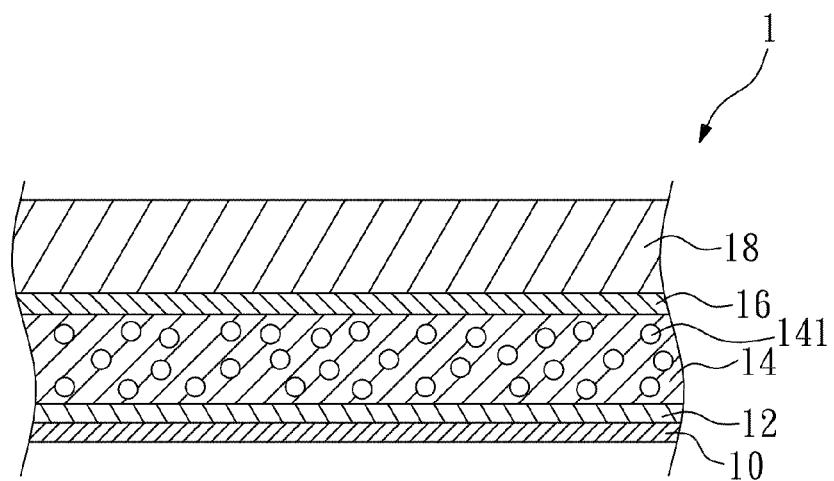

Referring to FIGS. 3 and 4, a substrate 18 is laminated on the second foamed layer 14, so as to form a first semi-finished product 1. In this embodiment, the following lamination method is used. Firstly, a second glue layer 16 is formed on the second foamed layer 14 by coating (FIG. 3), and then the second glue layer 16 is dried at a temperature of 60° C. to 140° C. The material of the second glue layer 16 is a polyurethane resin.

Then, as shown in FIG. 4, the substrate 18 is placed on the second glue layer 16, such that the substrate 18 is laminated on the second foamed layer 14. The substrate 18 is a fabric, for example, a woven fabric, a super-woven fabric, or a non-woven fabric.

Figure 5:
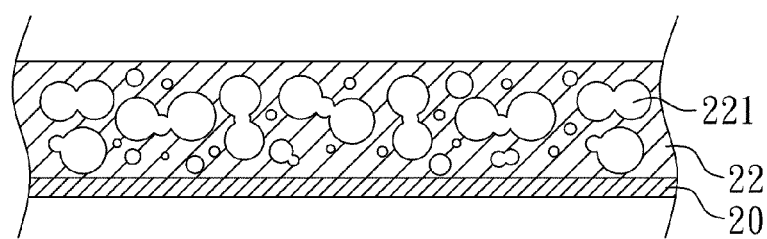

Referring to FIG. 5, a first polymer mixture is foamed and then coated on a release paper 20, and dried at a temperature of 100° C. to 140° C. to form a first foamed layer 22. The first polymer mixture contains a first polymer resin and other additives. The first polymer resin is aqueous polymer resin (for example, polyurethane), polyacrylic resin (that is, polymethyl-methacrylate, PMMA), ethylene-vinyl acetate copolymer (EVA), styrene-butadiene (SB), or styrene-butadiene-styrene (SBS), and is foamed by physical foaming. After being foamed, the first foamed layer 22 has a density of 0.25 g/cm$^3$ to 0.7 g/cm$^3$. The first foamed layer 22 has a plurality of first cells 221, and a part of the first cells 221 are in communication with each other and form a tunneling cavity structure.

In the present invention, the above two foaming methods are different. The second polymer mixture of the second foamed layer 14 is chemically foamed, the second cells 141 are not in communication with each other, and the variation in size of the second cells 141 is relatively small. That is, the second cells 141 have relatively uniform size. The first polymer mixture of the first foamed layer 22 is physically foamed, a part of the first cells 221 are in communication with each other, and the variation in size of the first cells 221 is relatively large. That is, the size of the first cells 221 varies significantly. In addition, the largest cell among the first cells 221 is about 300 to 400 μm, and is visible to the naked eye. Therefore, the variation in size of the second cells 141 is smaller than that of the first cells 221.

Then, the first foamed layer 22 is released to form a second semi-finished product.

Figure 6:
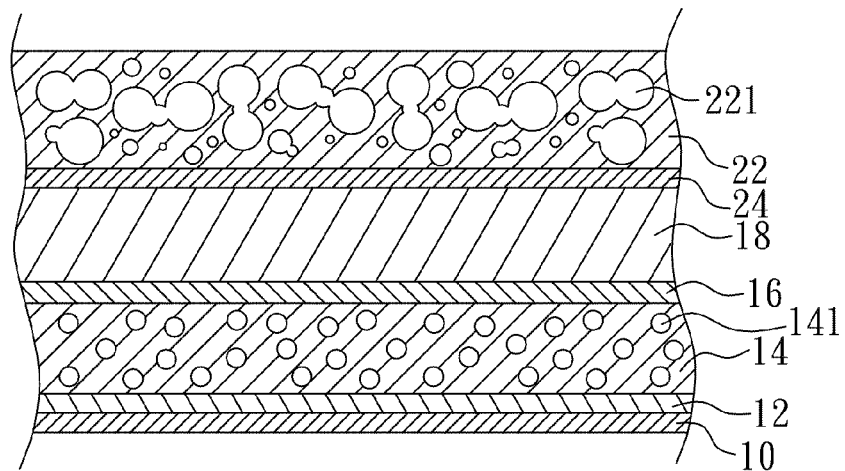
Figure 7:
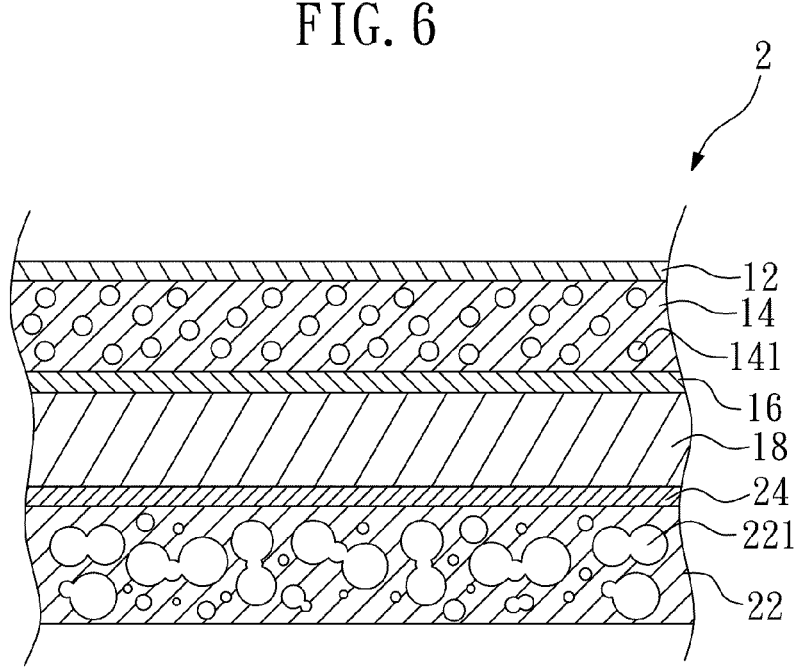

Referring to FIGS. 6 and 7, the first foamed layer 22 is formed on the substrate 18, and is then released to obtain a multi-layered material 2. In this embodiment, the first foamed layer 22 is formed on the substrate 18 by lamination as follows. Firstly, a first glue layer 24 is formed on the substrate 18 by coating (FIG. 6), and then the first glue layer 24 is dried at a temperature of 60° C. to 140° C. The material of the first glue layer 24 is polyurethane resin.

Then, the first foamed layer 22 (the second semi-finished product) is placed on the first glue layer 24, such that the first foamed layer 22 is laminated on the substrate 18. Then, the release paper 10 is removed, so as to obtain the multi-layered material 2.

Figure 8:
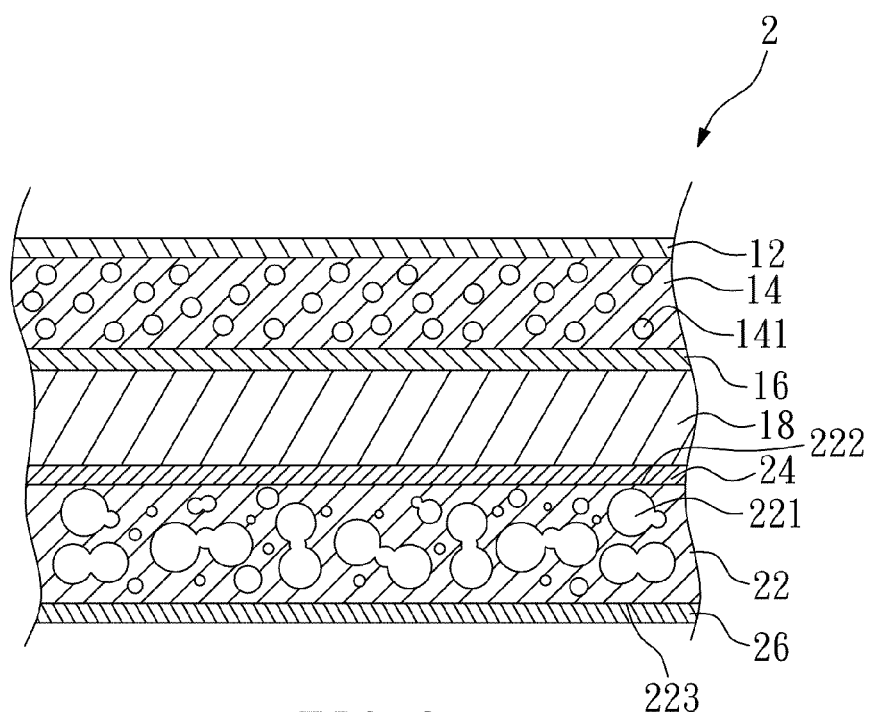

Preferably, referring to FIG. 8, this embodiment further includes a step of forming an adhesive layer 26 on the first foamed layer 22. The material of the adhesive layer 26 is thermoplastic resin, for example, thermoplastic urethane (TPU), polyurethane (PU) adhesive, ethylene-vinyl acetate copolymer (EVA) adhesive, hot melt adhesive, or a mixture thereof.

In this embodiment, the second polymer mixture of the second foamed layer 14 is chemically foamed, and the first polymer mixture of the first foamed layer 22 is physically foamed. However, in another embodiment, the materials and foaming methods of the second foamed layer 14 and the first foamed layer 22 are interchangeable. That is, the second polymer resin is an aqueous polymer resin and is foamed by physical foaming, the second foamed layer 14 has a density of 0.25 g/cm$^3$ to 0.7 g/cm$^3$, and a part of the second cells 141 are in communication with each other. The first polymer resin has a solid content higher than 50% and is foamed by chemical foaming, the first cells 221 are not in communication with each other, and the variation in size of the first cells 221 is smaller than that of the second cells 141. The material of the first polymer resin is a polyurethane resin, and the material of the second polymer resin is polyurethane.

Figure 9:
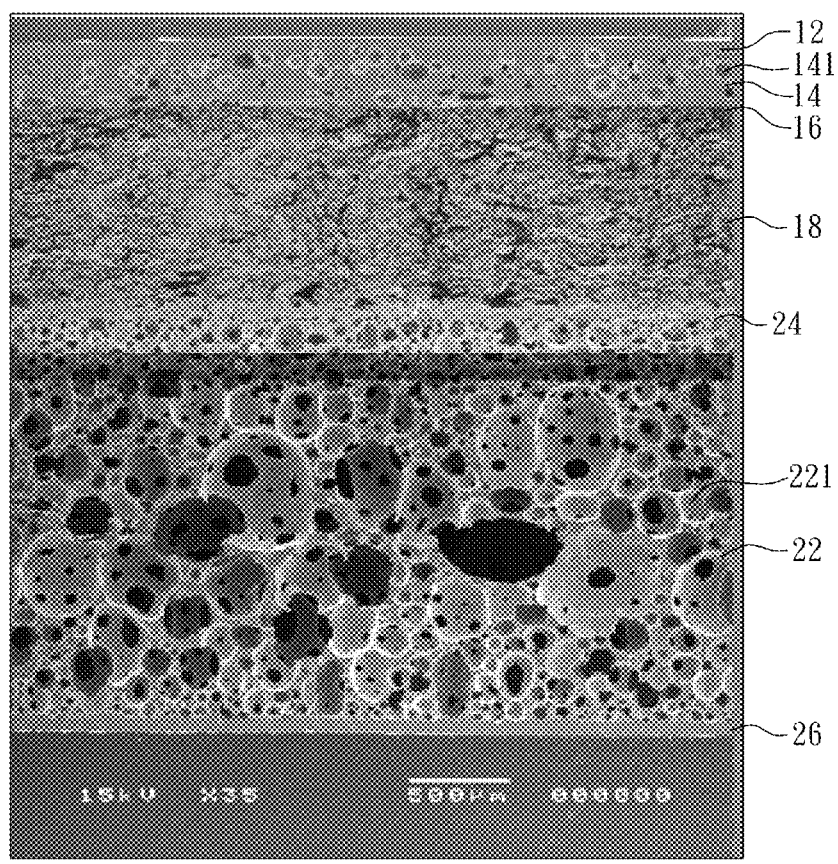
FIG. 9 is a photograph of a multi-layered material according to a first embodiment of the present invention.

FIG. 9 is a photograph of a multi-layered material according to a first embodiment of the present invention. FIG. 8 is a schematic view of a multi-layered material according to a first embodiment of the present invention. The multi-layered material 2 can be used as a surface cover of a ball, and comprises a first foamed layer 22, a substrate 18, a second foamed layer 14 and a surface layer 12. The first foamed layer 22 is formed by foaming a first polymer resin, and had an upper surface 222, a lower surface 223 and a plurality of first cells 221. The first polymer resin is aqueous polymer resin (for example, polyurethane), polyacrylic resin (that is, polymethyl-methacrylate, PMMA), ethylene-vinyl acetate copolymer (EVA), styrene-butadiene (SB), or styrene-butadiene-styrene (SBS), and is foamed by physical foaming. The first foamed layer 22 is foamed by physically foaming, and has a density of 0.25 g/cm$^3$ to 0.7 g/cm$^3$. A part of the first cells 221 are in communication with each other and form a tunneling cavity structure.

The substrate 18 is a fabric (for example, a woven fabric, a super-woven fabric, or a non-woven fabric) and is disposed on the upper surface 222 of the first foamed layer 22. Preferably, there is a first glue layer 24 disposed between the first foamed layer 22 and the substrate 18 for adhering the first foamed layer 22 and the substrate 18. The material of the first glue layer 24 is polyurethane resin.

The second foamed layer 14 is disposed above the substrate 18. In this embodiment, the second foamed layer 14 is disposed on the substrate 18, formed by foaming a second polymer resin, and has a plurality of second cells 141. The second polymer resin has a solid content higher than 50%, the material of the second polymer resin is polyurethane resin, polystyrene (PS), polyvinyl chloride (PVC), ethylene-vinyl acetate copolymer (EVA), polyethylene (PE), styrene-butadiene (SB), or styrene-butadiene-styrene (SBS). The second foamed layer 14 is foamed by chemical foaming. The second cells 141 are not in communication with each other and form an enclosed cavity structure.

The foaming method of the second foamed layer 14 is different from that of the first foamed layer 22. The second foamed layer 14 is chemically foamed, the second cells 141 are not in communication with each other, and the variation in size of the second cells 141 is relatively small. That is, the second cells 141 have relatively uniform size. The first foamed layer 22 is physically foamed, a part of the first cells 221 are in communication with each other, and the variation in size of the first cells 221 is relatively large. That is, the size of the first cells 221 varies significantly. In addition, the largest cell among the first cells 221 is about 300 to 400 μm, and is visible to naked eyes. Therefore, the variation in size of the second cells 141 is smaller than that of the first cells 221.

Preferably, there is a second glue layer 16 disposed between the second foamed layer 14 and the substrate 18 for adhering the second foamed layer 14 and the substrate 18. The material of the second glue layer 16 is polyurethane resin.

The surface layer 12 is disposed on the second foamed layer 14, and the material of the surface layer 12 is a third polymer resin. The third polymer resin has a solid content lower than 50%, and the third polymer resin is a polyurethane resin.

Preferably, the multi-layered material 2 further comprises an adhesive layer 26 which is disposed under the first foamed layer 22. The material of the adhesive layer 26 is thermoplastic resin, for example, thermoplastic urethane (TPU), polyurethane (PU) adhesive, ethylene-vinyl acetate copolymer (EVA) adhesive, hot melt adhesive, or a mixture thereof.

In this embodiment, the second foamed layer 14 is chemically foamed, and the first foamed layer 22 is physically foamed. However, in another embodiment, the second foamed layer 14 and the first foamed layer 22 are interchangeable. That is, the second polymer resin is an aqueous polymer resin and is foamed by physical foaming, the second foamed layer 14 has a density of 0.25 g/cm$^3$ to 0.7 g/cm$^3$, and a part of the second cells 141 are in communication with each other.

The first polymer resin has a solid content higher than 50% and is foamed by chemical foaming, the first cells 221 are not in communication with each other, and the variation in size of the first cells 221 is smaller than that of the second cells 141. The material of the first polymer resin is a polyurethane resin, and the material of the second polymer resin is polyurethane.

The present invention has the following advantages. When the multi-layered material 2 is used as a surface cover of a ball, it can absorb substantial impact energy, and the combination of two different foamed structures (the first foamed layer 22 and the second foamed layer 14) can provide better resilience and control. In addition, the multi-layered material 2 does not require any reinforcement or improvement, thereby improving manufacturing efficiency. Moreover, with the additional adhesive layer 26, the multi-layered material 2 can be directly pressed on the bladder by hot pressing without machine sewing or hand sewing.

Figure 10:
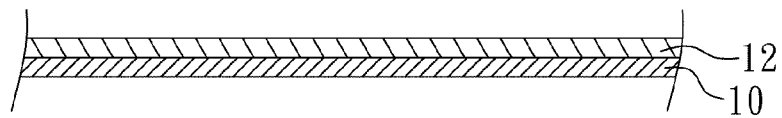
FIGS. 10 to 17 are schematic views illustrating steps of a method for making a multi-layered material according to a second embodiment of the present invention.

FIGS. 10 to 17 are schematic views illustrating steps of a method for making a multi-layered material according to a second embodiment of the present invention. Referring to FIG. 10, a third polymer mixture is formed on a release paper 10 by coating, and then the third polymer mixture is dried at a temperature of 50° C. to 130° C. to form a surface layer 12. The surface layer 12 of this embodiment is the same as the surface layer 12 of the first embodiment.

Figure 11:
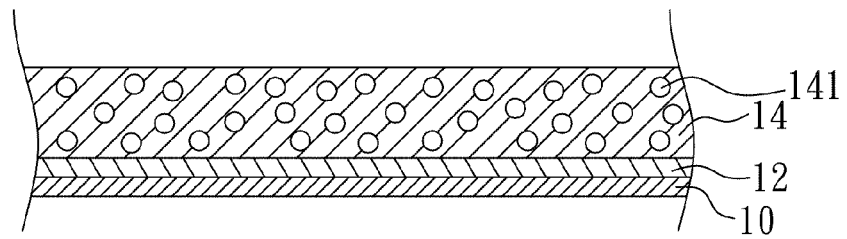

Referring to FIG. 11, a second polymer mixture is foamed and then formed on the surface layer 12 by coating, and then the second polymer mixture is dried at a temperature of 120° C. to 180° C. to form a second foamed layer 14. The second foamed layer 14 of this embodiment is the same as the second foamed layer 14 of the first embodiment.

Figure 12:
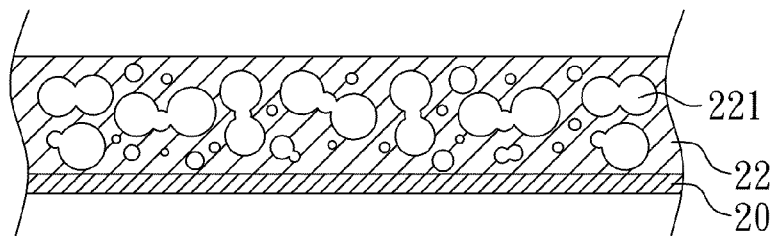

Referring to FIG. 12, a first polymer mixture is foamed and then coated on a release paper 20, and dried at a temperature of 100° C. to 140° C. to form a first foamed layer 22. The first foamed layer 22 of this embodiment is the same as the first foamed layer 22 of the first embodiment.

Figure 13:
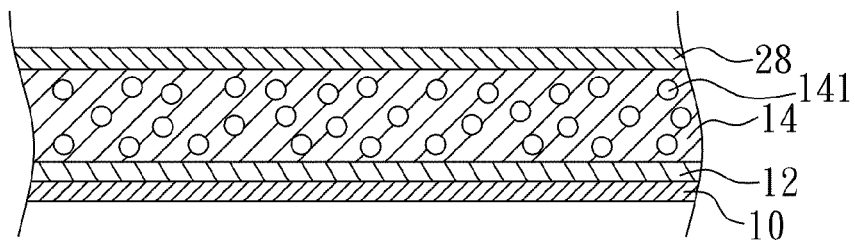

Referring to FIG. 13, a third glue layer 28 is formed on the second foamed layer 14 by coating, and then the third glue layer 28 is dried at a temperature of 60° C. to 140° C. The material of the third glue layer 28 is polyurethane resin.

Figure 14:
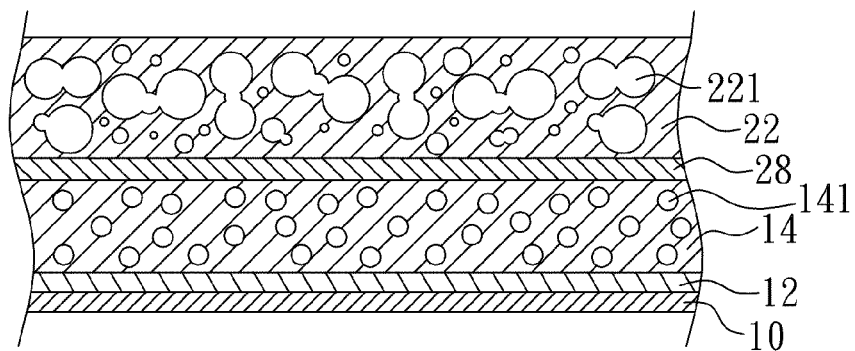

Referring to FIG. 14, the first foamed layer 22 is placed on the third glue layer 28, such that the first foamed layer 22 is laminated on the second foamed layer 14.

Figure 15:
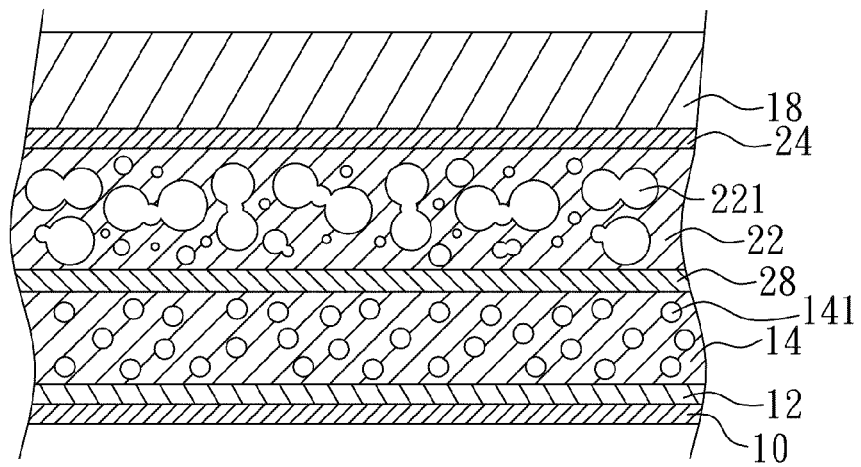
Figure 16:
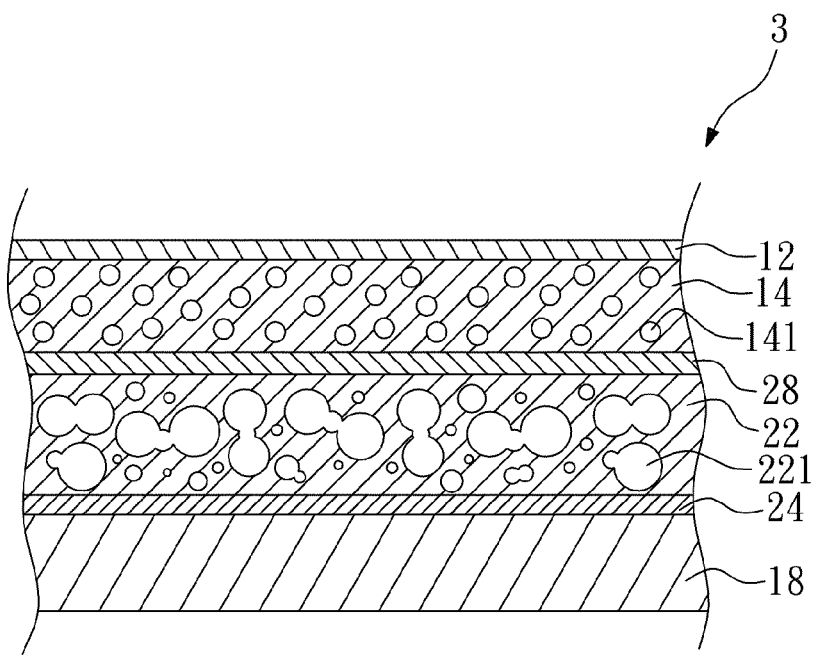

Referring to FIG. 15, a first glue layer 24 is formed on the first foamed layer 22 by coating. The first glue layer 24 of this embodiment is the same as the first glue layer 24 of the first embodiment. Then, the substrate 18 is placed on the first glue layer 24, such that the substrate 18 is laminated on the first foamed layer 22. Then, the release paper 10 is removed, so as to obtain the multi-layered material 3, as shown in FIG. 16.

Figure 17:
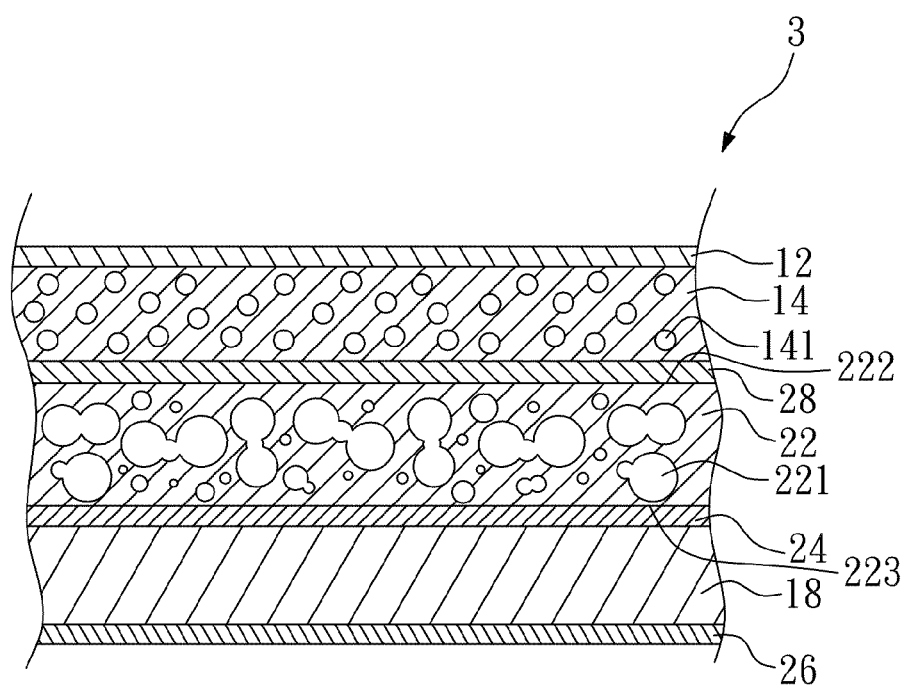

Preferably, referring to FIG. 17, this embodiment further includes a step of forming an adhesive layer 26 on the lower surface of the substrate 18. The adhesive layer 26 of this embodiment is the same as the adhesive layer 26 of the first embodiment.

FIG. 17 is a schematic view of a multi-layered material according to a second embodiment of the present invention. The multi-layered material 3 can be used as a surface cover of a ball, and comprises a substrate 18, a first foamed layer 22, a second foamed layer 14, a surface layer 12 and an adhesive layer 26. The multi-layered material 3 of this embodiment is the same as the multi-layered material 2 (FIG. 8) of the first embodiment; the difference is that the positions of the substrate 18 and the first foamed layer 22 in the multi-layered material 3 are interchanged. That is, the substrate 18 is disposed on the lower surface 223 of the first foamed layer 22, and the second foamed layer 14 is adhered to the upper surface 222 of the first foamed layer 22. The adhesive layer 26 is disposed on the lower surface of the substrate 18.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A method for making a multi-layered material, comprising the following steps:
   (a) forming a third polymer mixture on a release paper, the third polymer mixture containing a third polymer resin;
   (b) drying the third polymer mixture to form a surface layer;
   (c) foaming a second polymer mixture and then forming the foamed second polymer mixture on the surface layer, the second polymer mixture containing a second polymer resin;
   (d) drying the second polymer mixture to form a second foamed layer, the second foamed layer having a plurality of second cells;
   (e) laminating a substrate on the second foamed layer, the substrate being a fabric;
   (f) foaming a first polymer mixture and then drying the foamed first polymer mixture to form a first foamed layer, the first polymer mixture containing a first polymer resin, the first foamed layer having a plurality of first cells, wherein the foaming method of step (c) is different from that of step (f), and the variation in size of the second cells is different from that of the first cells; and
   (g) forming the first foamed layer on the substrate to obtain a multi-layered material.

2. The method according to claim 1, wherein in step (a), the third polymer resin has a solid content lower than 50%, and the material of the third polymer resin is a polyurethane resin.

3. The method according to claim 1, wherein in step (c), the second polymer resin has a solid content higher than 50%, the foaming method is chemical foaming; in step (d), the second cells are not in communication with each other; in step (f), the first polymer resin is an aqueous polymer resin and the foaming method is physical foaming, the first foamed layer has a density of 0.25 g/cm³ to 0.7 g/cm³, a part of the first cells are in communication with each other, and the variation in size of the second cells is smaller than that of the first cells.

4. The method according to claim 1, wherein in step (c), the second polymer resin is an aqueous polymer resin, the foaming method is physical foaming; in step (d), the second foamed layer has a density of 0.25 g/cm³ to 0.7 g/cm³, and a part of the second cells are in communication with each other; in step (f), the first polymer resin has a solid content higher than 50%, the foaming method is chemical foaming, the first cells are not in communication with each other, and the variation in size of the first cells is smaller than that of the second cells.

5. The method according to claim 1, wherein in step (a), the third polymer mixture is coated on the release paper; in step (c), the second polymer mixture is coated on the surface layer; and in step (g), the first foamed layer is formed on the substrate by lamination.

6. The method according to claim 1, further comprising a step of forming an adhesive layer on the first foamed layer after step (g), wherein the material of the adhesive layer is thermoplastic resin, the thermoplastic resin is thermoplastic urethane (TPU), polyurethane (PU) adhesive, ethylene-vinyl acetate copolymer (EVA) adhesive, hot melt adhesive, or a mixture thereof.

7. A method for making a multi-layered material, comprising the following steps:
  (a) forming a third polymer mixture on a release paper, the third polymer mixture containing a third polymer resin;
  (b) drying the third polymer mixture to form a surface layer;
  (c) foaming a second polymer mixture and then forming the foamed second polymer mixture on the surface layer, the second polymer mixture containing a second polymer resin, wherein the second polymer resin is an aqueous polymer resin, and the foaming method is physical foaming;
  (d) drying the second polymer mixture to form a second foamed layer, the second foamed layer having a plurality of second cells, wherein the second foamed layer has a density of 0.25 g/cm$^3$ to 0.7 g/cm$^3$, and a part of the second cells are in communication with each other;
  (e) foaming a first polymer mixture and then drying the foamed first polymer mixture to form a first foamed layer, the first polymer mixture containing a first polymer resin, the first foamed layer having a plurality of first cells, wherein the foaming method of step (c) is different from that of step (e), the variation in size of the second cells is different from that of the first cells, the first polymer resin has a solid content higher than 50%, the foaming method is chemical foaming, the first cells are not in communication with each other, and the variation in size of the first cells is smaller than that of the second cells;
  (f) forming the first foamed layer on the second foamed layer; and
  (g) laminating a substrate on the first foamed layer, the substrate being a fabric.

8. The method according to claim 7, wherein in step (a), the third polymer resin has a solid content lower than 50%, and the material of the third polymer resin is a polyurethane resin.

9. The method according to claim 7, wherein in step (a), the third polymer mixture is coated on the release paper; in step (c), the second polymer mixture is coated on the surface layer; and in step (f), the first foamed layer is formed on the second foamed layer by lamination.

10. The method according to claim 7, further comprising a step of forming an adhesive layer on the substrate after step (g), wherein the material of the adhesive layer is thermoplastic resin, the thermoplastic resin is thermoplastic urethane (TPU), polyurethane (PU) adhesive, ethylene-vinyl acetate copolymer (EVA) adhesive, hot melt adhesive, or a mixture thereof.

11. A method for making a multi-layered material, comprising the following steps:
  (a) forming a third polymer mixture on a release paper, the third polymer mixture containing a third polymer resin;
  (b) drying the third polymer mixture to form a surface layer;
  (c) foaming a second polymer mixture and then forming the foamed second polymer mixture on the surface layer, the second polymer mixture containing a second polymer resin, wherein the second polymer resin has a solid content higher than 50%, and the foaming method is chemical foaming;
  (d) drying the second polymer mixture to form a second foamed layer, the second foamed layer having a plurality of second cells, wherein the second cells are not in communication with each other;
  (e) foaming a first polymer mixture and then drying the foamed first polymer mixture to form a first foamed layer, the first polymer mixture containing a first polymer resin, the first foamed layer having a plurality of first cells, wherein the foaming method of step (c) is different from that of step (e), the variation in size of the second cells is different from that of the first cells, the first polymer resin is an aqueous polymer resin and the foaming method is physical foaming, the first foamed layer has a density of 0.25 g/cm$^3$ to 0.7 g/cm$^3$, a part of the first cells are in communication with each other, and the variation in size of the second cells is smaller than that of the first cells;
  (f) forming the first foamed layer on the second foamed layer; and
  (g) laminating a substrate on the first foamed layer, the substrate being a fabric.

* * * * *